Patented Jan. 23, 1934

1,944,800

UNITED STATES PATENT OFFICE 1,944,800

ROOFING GRANULE

Ernest H. Nichols, Hagerstown, Md.

No Drawing. Application December 3, 1930
Serial No. 499,856

4 Claims. (Cl. 91—70)

This invention relates to new and useful improvements in roofing granules, and particularly to colored shale granules of this character.

One object of the invention is to provide a shale roofing granule which will have a more permanent color than granules of this type, heretofore.

Another object is to provide granules of this character wherein the coloring matter will not rub off, in the form of dust, as is common with similar granules heretofore.

Another object is to provide roofing granules which will be effectively waterproof, and proof against stain from the tar or pitch on the roof.

Other objects and advantages will be apparent from the following description.

In the methods, now employed, for coloring shale roofing granules, especially in the use of red, it has been found that, after the dyeing and firing of the granules, this coloring material will rub off in the form of dust. This deterioration of the coloring continues until such color has faded to a marked degree, and the granules become porous, and decompose, thereby, in a short time defeating the original purpose of such granules. Ferrous sulfate is generally used to produce this intensified red color, but such color becomes dust and rubs off, as mentioned above.

I have found that the use of borax, in conjunction with the ferrous sulfate, the latter is prevented from becoming powdered and rubbing off the granules, when applied and treated as will be explained more clearly later herein. The granules used are preferably shale. The purpose for which the borax is used is two-fold. First, it is intended to form a compound which does not permit the ferrous sulfate to come off the granules, in the form of dust, and at the same time lowers the fusion point of the silica in the granules. Second, it combines with the silicon in the granules, and under the influence of heat, when the granules are fired, forms an insoluble colored borosilicate in the granules, as well as on the surfaces thereof, which results in a more permanent weatherproof product.

In the method employed in coloring and waterproofing the granules, there are two solutions used. The first solution consists of a solution of ferrous sulfate and water, in the proportions of thirty-six (36) grams of the former and 54 c.c. of the latter. The other solution consists of borax and water, in the proportions as to make a saturate solution. I then take twenty-five (25) c.c. of ferrous sulfate, and seventy-five (75) c.c. of the saturate solution of borax, to make a mixture of one hundred (100) c.c. This mixture is sufficient to properly moisten two hundred and fifty (250) grams of the granules, which granules have been preheated to a temperature of 1300° F. The heated granules, while still hot, are moistened by said mixture. After thorough mixing, the moist mass of granules is placed in crucibles in a muffle furnace, and fired at about 1600° F., for about ten (10) minutes. When cooled, the granules have a fair red color, free from dust, and effectively resist removal by rubbing.

There has thus been produced a roofing granule, having a red color, which is permanent, and which will not deteriorate by reason of the coloring matter rubbing off in the form of dust. Furthermore, the granules are provided with a coating or skin, of the desired color, which prevents deterioration by the natural elements, as well as discoloration and stains, by the tar or pitch of the roof on which the granules are used. This is accomplished by the use of the borax, which combines with the silicon inherent in the shale granules, to produce a waterproof borosilicate impregnation and coating.

While I have given certain proportions for the ferrous sulfate solution, and the borax solutions, together with the proportions of the two solutions to make up the moistening and coloring mixture, I wish it understood that such proportions of such solutions and mixture may be changed or varied in accordance with the characteristics of the shale granules, and the depth of the color desired in and on the granules.

What is claimed is:

1. That method of coloring granules of raw shale which consists in heating the granules, simultaneously treating the hot granules with aqueous solutions of ferrous sulphate and borax whereby to cause evaporation of at least part of the water, and reheating the granules.

2. That method of coloring granules of raw shale which consists in heating the granules, simultaneously treating the hot granules with aqueous solutions of ferrous sulphate and borax whereby to cause evaporation of at least part of the water, and reheating the granules to a higher temperature than the temperature to which the granules are first heated.

3. That method of coloring granules of raw shale which consists in heating the granules, simultaneously treating the hot granules with aqueous solutions of ferrous sulphate and borax whereby to cause evaporation of at least part of the water, and reheating the granules while protecting the granules from contact with fuel gases.

4. That method of coloring granules of raw shale which consists in heating the granules, simultaneously treating the hot granules with aqueous solutions of ferrous sulphate and borax whereby to cause evaporation of at least part of the water, and reheating the granules to a higher temperature than the temperature to which the granules are first heated while protecting the granules from contact with fuel gases.

ERNEST H. NICHOLS.